H. MARSHALL.
Plow.
No. 79,486.
Patented June 30, 1868.
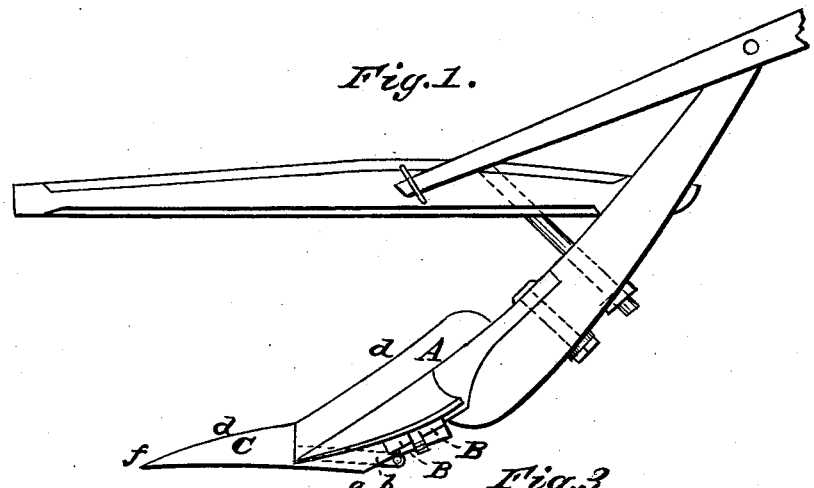
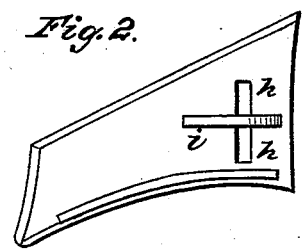
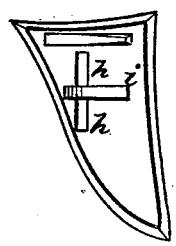
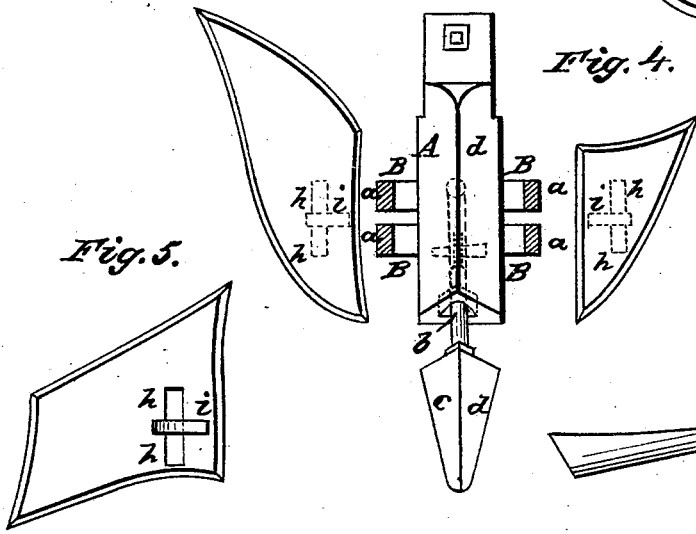
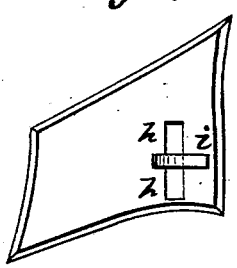
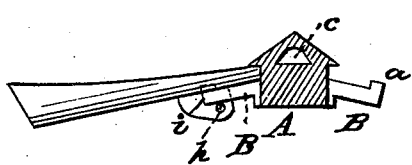
Witnesses:
Leopold Ever
A. A. Featman
Inventor:
Hammond Marshall
per Alexander T. Mason
Atty

United States Patent Office.

HAMMOND MARSHALL, OF ATLANTA, ASSIGNOR TO HIMSELF AND T. W. CHANDLER, OF FULTON COUNTY, GEORGIA.

*Letters Patent No. 79,486, dated June 30, 1868.*

IMPROVEMENT IN PLOWS.

*The Schedule referred to in these Letters Patent and making part of the same.*

TO ALL WHOM IT MAY CONCERN:

Be it known that I, HAMMOND MARSHALL, of Atlanta, in the county of Fulton, and in the State of Georgia, have invented certain new and useful Improvements in Plows; and do hereby declare that the following is a full, clear, and exact description thereof, reference being had to the accompanying drawings, and to the letters of reference marked thereon.

The nature of my invention consists in the manner of fastening the wings and point of a plow to the main body, so that the same can be easily exchanged for others, if desired, thereby making them convertible; and also in providing different kinds of wings and mould-boards, so as to make the same main body answer for any purpose by merely changing the side-pieces.

In order to enable others skilled in the art to make and use my invention, I will now proceed to describe its construction and operation, referring to the annexed drawings, which form a part of this specification, and in which—

Figure 1 is a side view of the plow.

Figures 2 and 5, view of bottom side of the wings.

Figure 3, view of bottom side of the shovel.

Figure 4, plan view, showing the manner of fastening the different parts; and

Figure 6, front view of plow, with one wing inserted and point withdrawn.

A represents the main body of my plow, which is made of cast iron, and provided on each side with a slotted projection, B, the ends of which projections are flanged on their upper side, as shown in fig. 6, the flanges being marked $a\ a$.

The point C is provided with a pin, $b$, which is inserted into the hole $c$ on the shank A, and extends through the bottom thereof, where it is fastened by means of a pin passed through a hole in the end of the same, thus holding the point tightly and firmly up to the main body or shank.

The upper side of the shank, as well as that of the point, is bevelled upward from the sides, forming a continuous cutting-edge, $d\ d$, along the top of the plow, which edge is sharp enough to cut off roots like a knife.

The bottom of the plow, from the heel $e$ to the forward point $f$, is curved, pointing downward, so that the point will go into the ground.

The wings or blades are all provided on their under or bottom side with a lug or staple, $i$, and a groove, $h$, running on each side from this staple, which grooves are for the purpose of receiving the flanges $a\ a$, on the projections B B, when the lugs or staples on these wings are inserted in the slots on said projections, a small flange extending on each side of the shank, covering the joint thus formed between the wings and said shank. The blades are secured by means of a pin passing through a hole in that part of the lug $i$ which extends beneath the slotted projection B.

The wings, shovels, and mould-boards, as shown in the drawings, may be made of any size or shape desired, but so arranged that they all fit on to the same shank, so that they may be easily exchanged, one for another, by the means and in the manner described. And they, as well as the point C, may be made of cast steel, or any other suitable material.

Having thus fully described my invention, what I claim as new, and desire to secure by Letters Patent, is—

1. The shank A, constructed as described, with a sharp cutting-edge, $d\ d$, at the top, curved at the bottom, and provided with slotted projections B B, substantially as and for the purposes herein set forth.

2. The slotted and flanged projections B B on the shank A, in combination with the lugs $i\ i$ and grooves $h\ h$ on the wings, for the purpose of fastening the same together, substantially as and for the purposes herein set forth.

3. The pin $b$, on the point C, in combination with the hole $c$, on the shank A, for the purpose of fastening the same together, substantially as and for the purposes herein set forth.

In testimony that I claim the foregoing, I have hereunto set my hand, this fifteenth day of May, 1868.

HAMMOND MARSHALL.

Witnesses:
 WM. BATT,
 A. A. GOULDING.